US012704591B2

(12) United States Patent
Maskil et al.

(10) Patent No.: US 12,704,591 B2
(45) Date of Patent: Aug. 11, 2026

(54) RADAR SYSTEM AND METHOD

(71) Applicant: Elta Systems Ltd., Ashdod (IL)

(72) Inventors: Nissan Maskil, Hertzliya (IL); David Karasik, Moshav Gimzo (IL); Eran Rave, Hod Hasharon (IL)

(73) Assignee: ELTA SYSTEMS LTD., Ashdod (IL)

( * ) Notice: Subject to any disclaimer, the term of this patent is extended or adjusted under 35 U.S.C. 154(b) by 414 days.

(21) Appl. No.: 18/272,173

(22) PCT Filed: Jan. 20, 2022

(86) PCT No.: PCT/IL2022/050083
§ 371 (c)(1),
(2) Date: Jul. 13, 2023

(87) PCT Pub. No.: WO2022/168079
PCT Pub. Date: Aug. 11, 2022

(65) Prior Publication Data

US 2024/0302491 A1 Sep. 12, 2024

(30) Foreign Application Priority Data

Feb. 7, 2021 (IL) .......................................... 280705

(51) Int. Cl.
*G01S 7/292* (2006.01)
*G01S 7/03* (2006.01)

(52) U.S. Cl.
CPC ................ *G01S 7/292* (2013.01); *G01S 7/03* (2013.01)

(58) Field of Classification Search
CPC ........ G01S 13/006; G01S 17/006; G01S 7/03; G01S 7/292; G01S 7/4912
See application file for complete search history.

(56) References Cited

U.S. PATENT DOCUMENTS 6,515,539 B1 * 2/2003 Levanon ................... H01S 1/02 333/156
7,362,420 B2 * 4/2008 Zaugg ..................... G01S 17/08 356/5.01

(Continued)

FOREIGN PATENT DOCUMENTS

CN 110865354 A 3/2020
CN 110865385 A 3/2020
EP 1750145 A2 2/2007

OTHER PUBLICATIONS

Chen , et al., "Quantim Calibration of Multi-pixel Photon Counter and Its Application in High-Sensitivity Magnetometry with NV Center Ensemble", IEEE Journal of Selected Topics in Quantum Electronics, vol. 26, No. 3. DOI: 10.1109/JSTQE.2020.2991432. XP011790837, May/Jun. 2020, pp. 1-7.

(Continued)

*Primary Examiner* — Peter M Bythrow
(74) *Attorney, Agent, or Firm* — Ballard Spahr LLP

(57) ABSTRACT

A radar system is described. The system comprises a radiation transmission unit, a radiation collection unit, and a processing unit. The radiation transmission unit is configured to generate electromagnetic radiation formed by a plurality of quantum entangled photons comprising first transmitted photon (signal) and second reference photon (idler). The radiation transmission unit transmits the first transmitted photons toward a region to be inspected and measures the second reference photons to obtain and store measured data thereof. The radiation collection unit comprises at least one radiation collection element configured to receive photons reflected from one or more objects in said region and generate data indicative of one or more parameters of the collected photons. The processing unit is configured to receive stored measured data on the second reference photons and data on parameters of the collected (Continued)

photons from the radiation collection unit, and to determine correlation between the stored measured data and the collected photons to thereby differentiate between noise collected photons and reflection of said first transmitted photons from one or more objects in the region to be inspected.

13 Claims, 4 Drawing Sheets

(56) References Cited

U.S. PATENT DOCUMENTS

| | | | | |
|---|---|---|---|---|
| 7,375,802 | B2 | 5/2008 | Allen et al. | |
| 7,767,976 | B2 * | 8/2010 | Allen | G01S 17/00 250/393 |
| 7,989,775 | B2 * | 8/2011 | Allen | G01S 17/10 250/393 |
| 8,031,333 | B2 * | 10/2011 | Zaugg | H04B 10/70 356/5.1 |
| 8,339,581 | B2 * | 12/2012 | Guha | G01C 3/08 356/3.01 |
| 9,791,567 | B2 * | 10/2017 | Habif | G01S 7/487 |
| 2007/0296953 | A1 * | 12/2007 | Allen | G01S 7/41 356/28 |
| 2009/0278046 | A1 * | 11/2009 | Allen | G01S 17/00 250/336.1 |
| 2010/0177297 | A1 * | 7/2010 | Guha | G01C 3/08 356/4.01 |
| 2010/0252745 | A1 * | 10/2010 | Hunt | G01S 7/4861 250/372 |
| 2010/0277712 | A1 * | 11/2010 | Zaugg | G01S 17/02 356/5.01 |
| 2011/0026614 | A1 * | 2/2011 | Allen | G01S 17/10 375/259 |
| 2012/0076503 | A1 * | 3/2012 | Habif | G01S 7/4912 398/140 |
| 2016/0209497 | A1 * | 7/2016 | Habif | G01S 7/495 |
| 2017/0077665 | A1 * | 3/2017 | Liu | H01S 1/005 |
| 2018/0038956 | A1 * | 2/2018 | Habif | G01S 13/10 |
| 2018/0149476 | A1 * | 5/2018 | Huang | H04B 10/70 |

OTHER PUBLICATIONS

Durak , et al., "Object Tracking and Identification by Quantum Radar", Proceedings vol. 11167, Quantum Technologies and Quantum Information Science V. DOI: 10.1117/12.2550479. XP081510125, 2019, pp. 1-9.

Gieysztor, et al., "Interaction of a Heralded Single Photon with Nitrogen-VacancyCenters in a Diamond", Optics Express vol. 29, No. 2. https://doi.org/10.1364/OE.409882, Jan. 4, 2021, pp. 564-570.

Liu , et al., "Target Detection Aided by Quantum Temporal Correlations: Theoretical Analysis and Experimental Validation", Apr. 14, 2020, pp. 1-17.

Luong, et al., "Quantum Two-Mode Squeezing Radar and Noise Radar: Correlation Coefficients for Target Detection", Nov. 20, 2019, pp. 1-7.

"Chirp Compression", In Wikipedia, The Free Encyclopedia. Retrieved 11:38, Apr. 3, 2022, from https://en.wikipedia.org/w/index.php?title=Chirp_compression&oldid=97277 9527 Aug. 13, 2020 (Aug. 13, 2020) Chapter "Doppler tolerance of linear chirps", Aug. 13, 2020, 23 pages.

Breeze , et al., "Continuous-Wave Room-temperature Diamond Maser", Nature 555, 2018, pp. 493-496.

Chang , et al., "Quantum-Enhanced Noise Radar", Applied Physics Letters 114, Dec. 11, 2018, 5 pages.

Georgiev , et al., "Quantum Complementarity in Bipartite Entangled Gaussian States", Nov. 15, 2020, 18 pages.

Goldstein , et al., "Four Wave-Mixing in a Microstrip Kinetic Inductance Travelling Wave Parametric Amplifier", Apr. 23, 2020, 28 pages.

Harmon , "Single Photon Detection using Chromophores and Nitrogen Vacancies in Diamond", 2018 IEEE Research and Applications of Photonics In Defense Conference (Rapid). DOI: 10.1109/RAPID.2018.8509007, Aug. 22-24, 2018, 4 pages.

Maze , et al., "Nanoscale Magnetic Sensing with an Individual Electronic Spin in Diamond", Nature 455, 2008, pp. 644-647.

* cited by examiner

RADAR SYSTEM AND METHOD

TECHNOLOGICAL FIELD

The present invention is in the field of radar systems. The invention specifically relates to radar system utilizing quantum entangled signals for increased sensitivity and/or resolution.

BACKGROUND

Radar systems utilize reflection of radio frequency signals from various objects to determine data on range, position, and velocity of the object. Generally, radar systems are limited by resolution of detectable objects in accordance with Rayleigh diffraction limit, limiting the maximal resolution by the wavelength radiation used. In addition, to enable proper detection of objects, the transmitted signal is preferably of sufficient intensity providing reflection signal stronger than noise levels of the detection system, as well as detection of signal in the level of the noise and below.

Quantum entanglement is associated with conservation laws. Quantum entanglement occurs when two or more particles share quantum state. More specifically, the quantum states of entangled particle cannot be described independently from the state of other particles entangled thereto. This may result in situations where detecting parameters of one particle determined the corresponding parameters of the other particles.

Various techniques utilize entangled particles to provide clear distinction between photons associated with a desired signal and background noise.

U.S. Pat. No. 7,375,802 describes an entangled quantum particle generator that generates a signal including a plurality of entangled particles. The wavelength of the signal is the sum of the wavelengths of the entangled particles. A signal processor determines a characteristic of the target based on information derived from at least some of the entangled particles in the return signal. The frequency of the signal is selected to propagate the signal through a medium and the frequencies of the entangled particles are selected to provide sufficient data in the return signal to resolve the characteristic of the target.

GENERAL DESCRIPTION

There is a need in the art for a novel radar system and corresponding technique, enabling detection of objects within an inspection regions or volume, and enabling to increase signal to noise while operating with relatively low intensity interrogating signals. The present technique utilizes quantum entangled photons, typically within microwave or high frequency RF wavelength range, for identifying signal related photons over background noise within collected radiation. The technique of the invention may be used for example to provide transmission and detection of signals with low probability of intersect (LPI) as well as enable detection of low reflected signals.

The present technique provides a radar system comprising a radiation transmission unit, radiation collection unit, and a processing/control unit. The radiation transmission unit includes a radiation source comprising at least one nonlinear element, configured to introduce nonlinear interaction to the emitted radiation. The nonlinear element is configured to introduce certain quantum entanglement between emitted photons, providing two or more groups of photons comprising first transmitted photons (signal photons) and second reference photons (idler photons), where each of the first transmitted photons is entangled to a corresponding one of the second reference photons. The at least one nonlinear element may be configured to provide down conversion of the radiation, for example utilize spontaneous parametric down conversation (SPDC). In this connection the nonlinear element may be a crystal structure having selected anisotropy or an arrangement of a plurality of such crystal structures, or other down converting elements as known in the art selected in accordance with frequency of the transmitted radiation.

The radiation transmission unit is configured to direct the first transmitted photons to be transmitted toward a selected region, denoted as inspection region, and to detect the second reference photons and generate reference photon data. The reference photon data is stored at a memory unit or storage unit for use in analysis of collected radiation. In some embodiments, the reference photons may be measured to determine phase relation between the reference photons and phase of a predetermined local oscillator. The local oscillator may be an electronic or atomic based oscillator generating high accuracy sine wave. The local oscillator is generally selected to provide low phase noise, to provide consistent phase relation over time. This enables to determine phase relations between the reference photons and the local oscillator wave at the time of measurement, generating a distribution of phase relations between a plurality of the reference photons and the local oscillator.

The radiation collection unit is configured to collect radiation arriving from the selected inspected region and generate output data indicative of collection radiation and one or more parameters of the collected radiation. The data on the collected radiation may be stored and is transmitted to processing with respect to stored data on the second reference photons. Typically, the radiation collection unit may utilize one or more single photon detectors (SPDS) positioned and arranged to collect and detect radiation arriving from the inspected region.

To this end, the radar system generally comprises a processing unit, the processing unit may include one or more processors, memory and input/output connections, and is configured to receive data from the radiation transmission unit and the radiation collection unit. The processing unit is configured and operable to receive measured data on the second reference photons from the radiation transmission unit, typically store this data on the reference photons in the memory for use in processing. The processing unit is further configured to receive data on collected photons from the radiation collection unit. Using the data on reference photons and data on collected photons, the processing unit operates for determining correlations between the reference and collected photons. This enables the processing to identify from the stream of collected photons, signal portions associated with photons transmitted from the radiation transmission unit over background noise. More specifically, the first transmitted photons are entangled with the second reference photons. As a result, parameters of the first transmitted photons and respective parameters of the second reference photons are highly correlated. Identifying such correlation in the collected radiation, enables the system of the present invention to filter out radiation components associated with the transmitted photons over noise.

It should be noted that generally, detection of entangled parameters between photons may require noise free and single-photon sensitive detection. However, the present technique utilizes relatively large number of photons in the transmitted radiation, and is configured for collecting radiation in open environment, where noise may generally limit any single-photon sensitivity. To this end, the present technique utilizes phase relation distribution of the second reference photons, providing reference data on the transmitted radiation.

Accordingly, the technique of the present invention may utilize detection of phase relations between the reference photons and a local oscillator unit. This phase relation provides reference photon data, while enabling to correlate data between the transmitted radiation and collected radiation. In a typical embodiment, the radiation transmission unit may emit a plurality of photons in each signal. Thus, the reference photon data may relate to phase relation distribution indicating distribution of the phase relations between the second reference photons and the local oscillator unit. The phase relation distribution is stored in the memory for use in comparing to collected radiation data.

Additionally, the radiation collection unit may be configured to determine phase relation between collected photons and the local oscillator unit providing collected radiation phase distribution. The collected radiation phase distribution is transmitted to the processing unit that operates to determine correlation between the phase relation distribution and the collected radiation phase distribution. A correlation level that is determined to exceed a selected or predetermined threshold indicates collection of a reflected signal. This enables detection of signal reflected from one or more objects in the inspected region over background noise, while allowing the use of relatively low intensity of the interrogating signal.

The radiation collection unit may include an array of radiation detectors configured for detecting collected photons within a selected wavelength/frequency range. Further, the radiation detectors are generally configured for generating output data indicative of collection of radiation and phase of the collected radiation. In some preferred embodiments, the array of radiation detectors may comprise an arrangement of radiation detectors having single-photon sensitivity. For example, the radiation detectors may utilize one or more color centers positioned/embedded in solid state (e.g., crystal) structures. The color centers may be held and operate for detection of electromagnetic radiation within a selected frequency range. For example, the color centers may be Nitrogen-Vacancies (NV center) within a crystalline structure, alternatively, the color center may be based on silicon vacancies, Di vacancies, oxygen vacancies or other types of color centers. The solid state or crystalline structure may be diamond, silicon, silicon carbide, carbides, metal oxides rare-earth crystals or other crystal structures.

As indicated above, the collection system may preferably utilize an arrangement of a plurality of radiation detectors. Each of the radiation detectors may be configured as of isolated quantum systems and configured and operable to interact with photons of the selected frequency range as sensing units. The detectors of the collection unit may be positioned under homogeneous magnetic field B generating energetic split between quantum states associated with the selected frequency of radiation to be collected. To this end the radiation collection unit system may comprise at least one magnetic field generator, e.g., magnet, coil arrangement etc.

The radiation collection unit may further comprise a driving unit configured for selectively providing electromagnetic drive pulses onto the array of detectors and reading unit configured to provide optical illumination directed at the detectors for reading state thereof. The drive pulses as selected to manipulate quantum states of the color centers and place the detectors in selected quantum states for detection. After a selected collection time, the reading unit is operated to provide optical illumination signal and to detect light emitted from the detectors color centers. This provides indication on detection of photons and data about phase of the detected photons.

For example, the detectors of the array may be formed as crystal platelets having one or more color centers embedded therein. The platelets may have size between 100 micrometers to 5 millimeters, or between 100 micrometers to 1 millimeter. The color centers (e.g., NV centers) provide spin moments that can be optically polarized and vary their spin state in response to interaction with detected photons, thereby acting as detection centers of the platelets.

The detectors of the radiation collection unit may generally be driven by selected electromagnetic pulses having frequency within a predetermined range around resonant frequency of transition between states of the color centers in the sensing units. For example. The electromagnetic pulses may have frequency aligned with the resonant frequency of the color centers, or within a selected range, e.g., 10 MHz to 100 MHz bandwidth around the resonant frequency of the color centers. The driving pulses are typically synchronized between the detectors, and between driving pulses, thus enabling to determine phase of the detected electromagnetic field (photons). For example, the driving pulses may be synchronized using the local oscillator, providing direct measurement of phase relations between collected photons and the local oscillator.

Accordingly, the radiation collection unit provides sensitive detection of radiation within a selected frequency range, arriving from the region of interest, and provide output data indicative of collected photons and relative phase of the photons. As indicated above, in some configurations, the radiation collection unit directly detects phase of collected photons with respect to local oscillator of the system. The collected data is transmitted to the processing unit, which operates to determine correlations between phase distribution of the reference photons from the radiation transmission unit, and phase distribution of the collected photons from the radiation collection unit. Such correlation indicates that at least a large portion of collected photons are reflected photons that were transmitted by the radiation transmission unit and reflected from objects in the region of interest. Radiation readings that do not correlate with the reference data indicates high probability of noise reading.

The processing unit may generally also utilize the arrangement of detectors in an array in the radiation collection unit. Such arrangement may be used for determining data on location of an object reflecting the transmitted signal toward the radiation collection unit. The array of the detectors may preferably be a two-dimensional array enabling to provide spatial information of the received radiation along 2 axes. Accordingly, the processing unit may operate to determine correlations between the collected signal phase data and reference data utilizing one or more phase variations between photon readings collected by different detector elements. This may be performed in a similar manner to phased array and beam steering operations, while the processing unit operates to determine correlation for the different collection beams differentiate between reflected signal and background noise. The processing unit may determine existence of an object if the correlation between collected radiation, in one or more collection beams, and the reference data exceeds a selected threshold.

Thus according to a broad aspect, the present invention provides a radar system comprising radiation transmission unit, radiation collection unit and a processing unit; the radiation transmission unit is configured for generating electromagnetic radiation formed by a plurality of quantum entangled photons comprising first transmitted photon (signal) and second reference photon (idler); the radiation transmission unit is configured to transmit the first transmitted photons toward a region to be inspected and to measure the second reference photons to obtain and store measured data thereof; the radiation collection unit comprises at least one radiation collection element configured to receive photons reflected from one or more objects in said region and generate data indicative of one or more parameters of the collected photons; and a processing unit configured to receive stored measured data on the second reference photons from the radiation transmission unit and data of parameters of the collected photons from the radiation collection unit, and to determine correlation between the measured reference photons and the collected photons to thereby differentiate within the collected photons between noise and reflection of said first transmitted photons from one or more objects in the region to be inspected.

According to some embodiments, the radar system may further comprise a local oscillator unit, said radiation transmission unit is operable to measure the second reference photons with respect to phase of said local oscillation unit and provide measured data comprising phase relation distribution of said second reference photons; said radiation collection unit operates for determining phase relations between collected photons and phase of said local oscillator.

According to some embodiments, the processing unit is configured to receive stored data comprising phase relation distribution of said second reference photons, and to receive data on phase relations of collected photons with respect to said local oscillator, the processing unit operates to determine correlation in phase relation distributions between the second reference photons and said collected photons to thereby identify collected photons associated with said first transmitted photons reflected from one or more objects in the region to be inspected.

According to some embodiments, the radiation transmission unit further comprises radiation amplifying unit configured to provide coherent amplification to said first transmitted photons to thereby enhance intensity of transmitted signal.

According to some embodiments, the amplifying unit comprises a maser amplifier.

According to some embodiments, the at least one radiation collection element of the collection unit is formed by one or more color centers within crystal structure being operated for detection of electromagnetic radiation within a selected frequency range.

According to some embodiments, the at least one antenna element (radiation collection element) is formed by one or more NV-center based detection unit.

According to some embodiments, the drive unit of the radiation collection elements is synchronized with a local oscillator.

According to some embodiments, the at least one radiation collection element of the collection unit is formed by one or more superconducting radiation detector.

According to some embodiments, the collection unit comprises an array of radiation detectors comprising a number of detectors each comprising one or more color centers within crystal structure, thereby providing data on spatial arrangement of collected radiation.

According to some embodiments, the processing unit is configured and operable for determining data on collected radiation wavefront based on collected photons having correlation with said second reference photons above a predetermined threshold, said data on collected radiation wavefront is thereby determined based on collection of the entangles first photons with reduced noise.

According to some embodiments, the electromagnetic radiation is within microwave frequency range.

According to some embodiments, the collection unit is configured for sweeping over frequency of collected photons, thereby enabling detection of doppler shifts in collected radiation.

According to another broad aspect, the present invention provides a method for use in radar system, the method comprising:

- generating one or more pairs of entangled photons, transmitting first photons toward a selected region, and detecting second photons to determine one or more parameters thereof;
- using a radiation collection unit and collecting radiation arriving from said selected region and generating data about collected photons;
- processing said data about collected photons and determining correlation between collected photons and parameters of said second reference photons, generating data of collected entangles radiation formed by photons having correlation above a predetermined threshold;
- processing said data of collected entangled radiation and determining data on one or more objects in said selected region.

According to some embodiments, the method may further comprise transmitting the first photons through a coherent amplifier for amplifying the transmitted signal while maintaining entanglement between the first and second photons.

According to some embodiments, said collecting radiation comprises using a detection unit formed by an array of NV-based detecting elements thereby detecting photons of the collected radiation and determining phase information of the collected photons.

According to some embodiments, the parameters of the second photons comprise phase of the second photons with respect to predetermined cycle, said determining correlation of collected photons and parameters of said second photons comprises determining phase data of the collected photon with respect to a predetermined cycle and determining variation in phase with respect to the predetermined cycle with that of the second photons.

According to some embodiments, said detecting second photons to determine one or more parameters thereof comprises detecting said second reference photons with respect to a local oscillator wave and determining reference data comprising phase distribution of said reference photons.

According to some embodiments, said determining correlation between collected photons and parameters of said second reference photons comprises determining correlation between phase distribution of the collected photons and the reference data.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
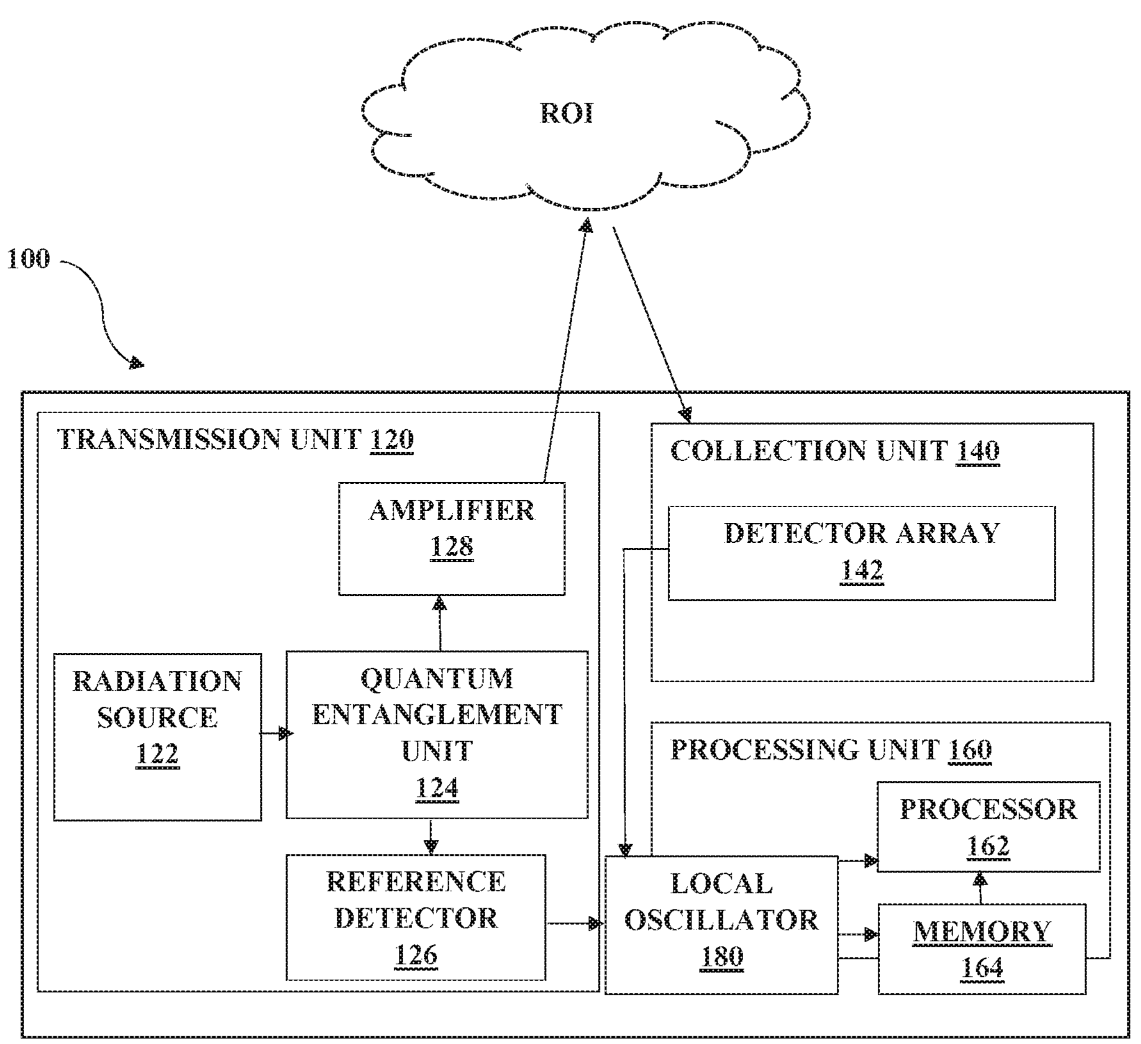
FIG. 1 illustrates schematically a radar system according to some embodiments of the present invention.

Reference is made to FIG. 1 schematically illustrating a radar system 100 according to some embodiments of the present invention. The system 100 includes a radiation transmission unit 120, radiation collection unit 140 and control/processing unit 160. Radar system 100 may generally also include a local oscillator 180, configured to provide accurate and stable oscillation data. The local oscillator may e.g., be an atomic clock or any other sine wave generator. The transmission unit 120 is configures for generating interrogating signal and reference signal, where the interrogating and reference signals are formed of entangles photons. The interrogating signal is transmitted toward a region of interest and the reference signal is measured to provide reference data. The reference data is used by the processing unit 160 to determine if signals collected by the radiation collection unit 140 relate to reflections of the interrogating signal or any other radiation that may be considered as noise. This technique enables the radar system of the present invention to operate with very low intensity of the interrogating signal or enhance signal to noise ratio for any given signal intensity used.

The radiation transmission unit 120 may generally include a radiation source 122, quantum entanglement unit 124 and reference detector 126, and may also include an amplifier 128. The radiation source 122 is configured and operable to generate electromagnetic radiation of a selected wavelength range and transmit the generated radiation to the quantum entanglement unit 124. The quantum entanglement unit 124 may generally include at least one element having nonlinear characteristics for propagation of radiation of the selected wavelength range. Typically, the nonlinear characteristics causes, at a certain probability, conversion of photons of the selected wavelength range into pairs of photons of longer wavelengths. For example, the quantum entanglement unit 124 may include a downconverter, half harmonic generator, spontaneous parametric down conversation (SPDC), etc. The quantum entanglement unit 124 is thus operable to convert one single photon of a selected wavelength range into two photons, having longer wavelengths. This results in the two photons to be entangled in one or more quantum properties thereof. The two photons generated at the quantum entanglement unit 124 include a first transmitted photon selected to be transmitted within the interrogating beam toward the region of interest, and second reference photon directed to the reference detector 126 to be measured. The first transmitted photons and second reference photons may be of the same frequency, or different frequency. Typically, the so-generated photons may be separated based on one or more different properties thereof. If the frequency of the first and second photons is similar, these photons may be transmitted within somewhat different path and separated accordingly. In cases where the first and second photons have different frequencies, the separation may be based on refraction or reflection properties, e.g., using an interface causing refraction of the photons to different angles, or using dichroic mirror transmitting photons of one frequency range and reflecting photons of other frequency range.

The first transmitted photons may be transmitted toward the region of interest as interrogating beams. In some configurations, the radiation transmission unit 120 may include an amplifier 128 configured to receive the first transmitted photons and amplify the signal by generating additional photons. The amplifier 128 is preferably a coherent amplifier, configured to preserve phase of the photons. For example, the amplifier may be laser amplifier, maser amplifier etc. The use of amplifier 128 enables increasing of the interrogating signal intensity, while generally maintaining phase of the transmitted signal with respect to the second reference photos.

As indicated, the second reference photons are measured using reference detector 126. The reference detector may be a high sensitivity detector configured to detect photons impinging thereon and provide output data indicative of collected photons and phase of the photons. For example, the reference detector 126 may be based on one or more color centers within solid crystals, e.g., nitrogen vacancy centers within diamond, or other types of detectors as described in more detail further below. Typically, the phase of the second reference photons may be determined with respect to local oscillator 180 data. In this connection, the local oscillator may be configured to provide oscillating wave having frequency close to that of the first transmitted photons, to enable stable comparison between phase variations.

The reference detector 128 provides output data on phase relations between the local oscillator 180 and phase data of the second reference photons. Generally, the phase relation data may be in the form of phase relation distribution, indicative of a plurality of second reference photons generated and detected within time interval associated with a single interrogating beam. The phase relation distribution is transmitted to the processing unit 160, e.g., to be stored within a memory unit 164 for use in analyzing collected signal.

The radiation collection unit 140 is configured for collecting radiation arriving from the region of interest, the collection unit 140 includes one or more detectors, and typically includes a detector array 142. The detector array 142 may be formed of an array of a selected number of detectors, each configured as high sensitivity detector for detecting input radiation of a selected wavelength range, aligned with wavelength range of the first transmitted photons. Additionally, the detector of the array 142 are configured to provide phase data of detected photons, generally with respect to oscillating wave of the local oscillator 180. Thus, the collection unit 140 is operated for collecting radiation arriving from the region of interest and provide data on photon count for each detector of the array 142, and relative phases of the photons with respect to wave of the local oscillator 180, to the processing unit 160. Typically, the detectors of the detector array 142 may be based on quantum two state system tuned with energetic separation based on frequency of the radiation to be collected.

More specifically, the radiation collection unit 140 may utilize an arrangement of a plurality of radiation detectors 142. Each of the radiation detectors may be configured as of isolated quantum system and configured and operable to interact with photons of the selected frequency range and provide readable state variation. The detectors of the collection unit 140 may be based on color centers within solid state material, typically positioned under homogeneous magnetic field B to provide energetic split between quantum states. The magnetic field B can be tuned to align the detector sensitivity with the selected frequency of radiation to be collected.

The radiation collection unit 140, and its detector array 142, provide output data on collected radiation including data on photons collected in each detector of the array and relative phase of the collected photons with respect to oscillating wave of the local oscillator 180. The phase relation distribution is used by the radar system to determine correlation between the collected phase distribution and reference photons phase distribution and determine within the collected radiation portions that relate to the transmitted photons being reflected from objects in the inspection regions and background noise related photons.

Data on the collected radiation and phase distribution thereof, is transmitted to the processing unit 160. The processing unit includes one or more processors 162, and memory unit 164 and configured to receive reference data from the radiation transmission unit 120, store the reference data in memory 164 to be used for processing. After transmitting an interrogating signal, the processing unit is configured to receive data on collected photons from the radiation collection unit 140 and determine correlation between the collected photons phase distribution and the reference data. As the interrogating signal is formed by photons that are at least partially entangled with the reference photons, statistical phase distribution between the collected photons and the reference data indicates a high probability that the collected photons are reflected interrogating signal, reflected from objects in the region of interest. Accordingly, the processing unit 160 selects radiation reading having correlation that exceed a predetermined (or selected) threshold as reflected signal, and marks radiation portions having correlation below the threshold as noise. In some embodiments, the threshold may include first and second thresholds, where signal portions between the between the first and second thresholds are marked as possible reflected signal to avoid miss readings of objects. This may be associated with lose of coherence of the transmitted radiation, typically occurring due to propagation in atmosphere and interaction with the object reflecting the signal, as well as loss of correlation that may occur due to amplification of the transmitted signal when used.

The processing unit 160 may also utilize data on spatial variations between photons collected in different detectors of the array 142. More specifically, given the assumption that photons reflected from an object in the region of interest may be somewhat scattered, the collected radiation may preferably be used to determine a virtual collect beam, and the phase distribution of the signals within the collect beam is processed to determine correlation with the reference data. This enables the technique to determine between signal and background noise as well as identify direction and location of one or more objects reflecting the interrogating signal. Accordingly, the processing unit 160 may be configured to determine selected collecting beams within data on collected radiation and determine phase correlation between signal portions of the collecting beam and the reference data to determine existence and location of one or more reflecting objects.

Generally, processing unit 160 may be configured as a computerized unit including one or more processors, memory, input and output communication ports. The processing unit 160 may also include a user interface. The processing unit 160 may be operable for controlling operation of the radar system, e.g., by generating operational commands to the radiation transmission unit 120 for transmitting interrogating signals and operating the radiation collection unit 140 for collecting radiation. Upon receiving data on collected radiation from the collation unit, the processing unit operates to determine correlation between phase distribution of the collected radiation, and phase distribution of the reference data, associated with the second reference photons' phases.

Figure 2:
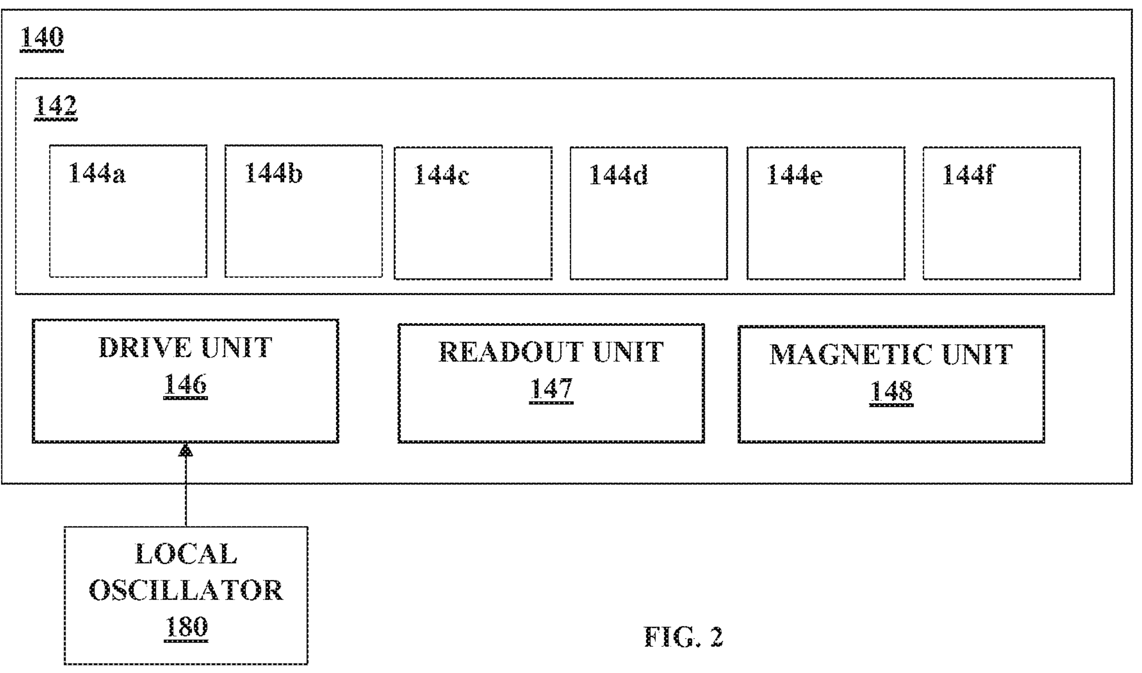
FIG. 2 exemplifies a configuration of detector array according to some embodiments of the present invention.

The radiation collection unit 140 is described in more detail in FIG. 2. As shown, the radiation collection unit 140 includes an array 142 of detectors including detectors 144*a* to 144*f*. The detector array 142 has a predetermined arrangement and is configured for collecting electromagnetic radiation to provide indication of spatial structure of collected radiation. It should be noted that the detector array 142 is exemplified herein with 6 detectors 144*a*-144*f*, generally however, the detector array 142 may include a selected number of detectors, generally denoted 144. Such selected number may be in the range of tens of detectors, hundreds of detectors etc.

The collection unit 140 generally also includes a drive unit 146, readout unit 147, and may include a magnetic unit 148. The collection unit 140 may also include an internal control unit (not specifically shown) or be controlled by the processing unit 160. Control of the collection unit may generally include generating operational commands for the collection unit 140, e.g., the drive 146, readout 147 and magnetic 148 units thereof. The collection unit 140 is generally configured to transmit data on received signals to the processing unit 160 for processing. The drive unit 146 may be configured to receive data on local oscillator 180 signal to thereby align drive pulses with the oscillating wave as indicated further below.

The detectors 144 are typically formed of a quantum system having two or more states (e.g., spin states). For example, each detector 144 may be formed by solid-state material having one or more defects generating a separated quantum system. The solid crystals of the detectors may include one defect in the crystals or a plurality of defects (many defects) in each crystal. Generally, the defects may act as color centers in the material. In some configurations the defects may be in the form of nitrogen vacancy (NV) canters in solid state structure, or silicon vacancies, Di vacancies, oxygen vacancies or other color centers. For example, detectors 144 may be formed of diamond material having one or many NV centers.

The drive unit 146 is configured to provide one or more external drive perturbation, applied onto the detector array 142. The drive perturbation is selected to establish the detectors 144 in quantum state suitable for detection. The drive unit 146 is configured to provide first drive signal, and in some embodiments, the drive unit 146 may be further configured to provide an additional second drive signal to the detectors 144 or array 142. The first drive pulses and second drive pulses are generally electromagnetic radiation pulses of a selected frequency and amplitude. The drive pulses are timed to enable retrieving data on phase of photons collected by the detectors 144. Further, the drive unit 146 is generally configured such that the phase of the drive pulses impinging on any of the different detectors 144 or the array 142, are similar or at least within known variation. This may be achieved setting path drive pulses between the drive unit 146 (or antenna thereof) and the detectors 144 such that phase of the drive pulses reaching each of the detectors 144, is equal, or at least known with simple relation between paths to the different detectors 144. This enables retrieval of phase relation between photons detected by the different detectors 144 and thus determining data on wavefront of signals collected by the sensor array.

The readout unit 147 is configured for collecting from the detectors 144, output data indicative of collection of photons and relative phase of the collected photons. The readout unit 147 may include a light source, e.g., laser, and detector unit. Generally, the readout unit 147 provides laser illumination of selected wavelength range directed onto the detectors 144 and detect variations in transmission, absorption and/or fluorescence emission of light by the detectors 144. Variations in optical or fluorescent properties of the color centers within the detectors 144 are indicative of photons collected by the detectors 144, enabling to detect low intensity electromagnetic signal.

As indicated above, the detectors 144 may typically be formed of solid-state structure (e.g., crystal structure) having one or more selected defects. Such defects may for example include nitrogen cavity centers. The defects effectively provide a quantum system having discrete set of states, thus allowing to monitor interaction of the quantum state of the defects with external fields, and specifically external magnetic field. Readout of photon collected by the different detectors 144 may generally be independent of other detectors 144 of the array 142, alternatively, the detectors 144 may be read in combination. The arrangement of the detectors 144 in array 142 is used to enable collection of spatial information of impinging radiation. More specifically, as each detector 144 provides data on impinging radiation and phase data of the collected photons, the collected data may be used to determine direction from which impinging radiation is arriving from. This is since the spatial structure of radiation is generally associated with spatial phase relations between electromagnetic fields, or with phase relations between photons collected at different locations.

Further, as indicated above, the collection unit 140 is configured to provide phase data of collected photons with respect to oscillating wave of the local oscillator 180. To this end the drive unit 146 and readout unit 147 may be operated in accordance with the local oscillator to provide drive pulses ate times selected in accordance with oscillating wave of the local oscillator 180. In this connection, phase of the drive pulses may be aligned with oscillating wave of the local oscillator 180 or with predetermined phase difference therebetween. Further, the drive unit 146 is preferably configured to provide equal optical path to drive pulses emitted from the drive unit 146 until interacting with the defects within the detectors 144. This provides readout of phase data with relation to wave of the local oscillator for any photon detected by the collection unit 140.

Figure 3:
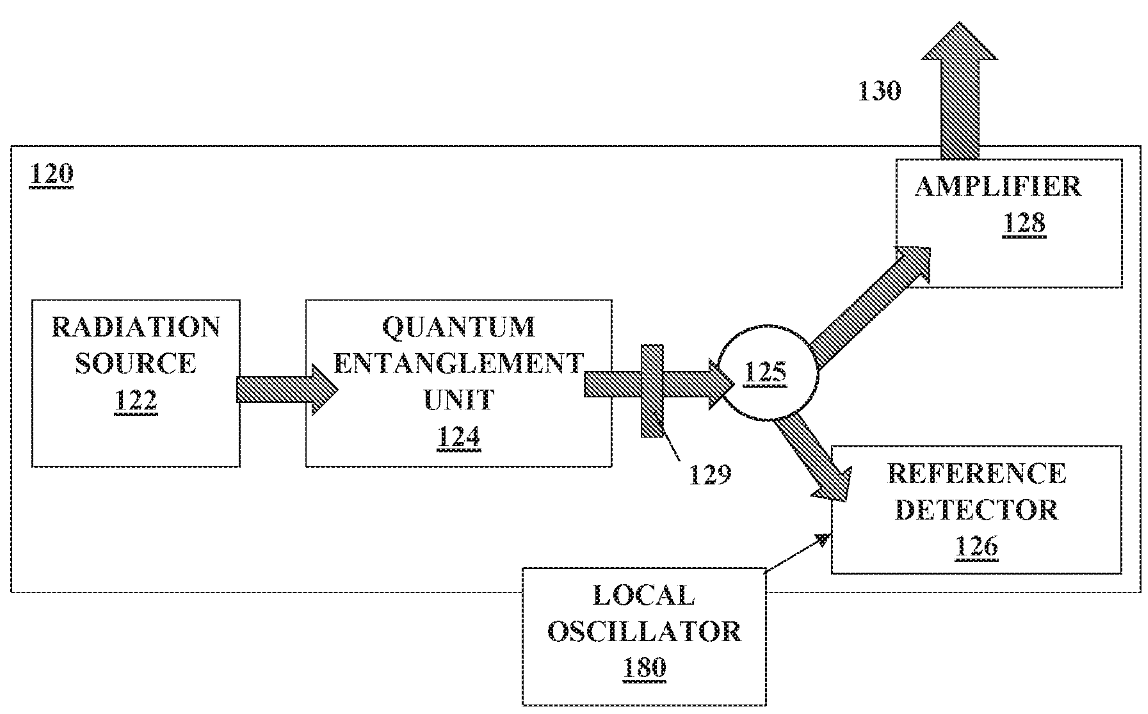
FIG. 3 exemplifies a configuration of the radiation transmission unit according to some embodiments of the invention.

Reference is made to FIG. 3 exemplifying a configuration of the radiation transmission unit 120 according to some embodiments of the invention. As shown, the adiation transmission unit 120 includes a radiation source 122, typically configured to provide emission of radiation within a selected first frequency range such as microwave frequency or IR frequency. The emitted radiation is transmitted into a quantum entanglement unit 124 configured to apply nonlinear down conversion to the radiation emitted by the radiation source 122. The down conversion is directed at generating two or more entangled photons of lower frequency from the photons emitted by the radiation source 122. Generally, the quantum entanglement unit 124 may include a nonlinear crystal of other nonlinear medium causing generation of lower harmonics in response to input radiation emitted by the radiation source 122. The quantum entanglement unit 124 thus emits radiation having lower frequency, referred to as generated frequency and including first transmitted photons and second reference photons. The transmitted and reference photons are entangled between them by one or more quantum states, caused by preservation of one or more parameters in the nonlinear interaction. For example, the photons may be entangled in polarization (or helicity), phase relation, frequency etc. Output radiation from the quantum entanglement unit 124 may be filtered using filter 129 to filter out radiation of the first frequency that was not down converted. Additionally, the down converted radiation may be separated using beam separator 125. The beam separator may be a polarization beam splitter, frequency-based separator such as dichroic element, grating etc. In some embodiments, path of the first transmitted photons and second reference photons may be different due to momentum conservation in the down conversion. In such configurations, the emitted photons may be separated spatially based on path of propagation thereof.

The radiation source 122 is preferably configured to emit coherent radiation. This is to enable efficient nonlinear conversion, e.g., using pulsed emission enabling high amplitude with relatively low average power consumption. Additionally, the use of coherent radiation enables to maintain relatively narrow phase distribution of the emitted radiation, and thus to the reference photons and transmitted photons. The radiation source may be a laser, maser (microwave amplification by stimulated emission) or other sources for coherent radiation. For example, the radiation source may be formed of or include a Kinetic Inductance Travelling Wave Amplifier (KITWA) or Microwave KITWA (MI-KITWA) described e.g., by Samuel Goldstein et al “Four Wave-Mixing in a Microstrip Kinetic Inductance Travelling Wave Parametric Amplifier” Appl. Phys. Lett. 116, 152602 (2020). In other examples, the radiation source may operate in room temperature, e.g., using room temperature NV diamond based mased such as described by Jonathan D. Breeze et at “Continuous-wave room-temperature diamond maser” Nature volume 555, pages 493-496(2018).

As indicated above. The reference photons are measured by reference detector 126 to obtain phase distribution data of the reference photons. The reference detector 126 may be essentially similar to the radiation collection unit 140, More specifically, the detector may include one or more quantum two-state system-based detectors (e.g., utilizing color centers) as described above, including drive unit and read out unit. The detector 126 is operates using input phase data from the local oscillator 180 to thereby provide output data on phase relation between the detected second reference photons and wave of the local oscillator 180. It should be noted that generally, the reference detector need not provide any spatial information on the reference photons. Accordingly, the reference detector may utilize a single detection center rather than an array of detectors. In some configurations, the reference detector 126 may include a limited number of two or more detectors, to provide redundancy and robustness.

The first transmitted photons are directed to an amplifier 128 to be amplified and generate interrogating beam 130. Amplifier 128 may generally be a coherent amplifier such as maser or laser amplifier and configured to maintain phase coherence of the transmitted photons. It should be noted that the amplifier may introduce phase changes onto the transmitted photons, however, to enable proper detection and maintain correlation between the transmitted photons and the reference data, the amplifier should maintain coherence of the beam, such that a relatively simple phase relation between the first transmitted photons and the amplified signal is maintained. Output facet of the amplifier acts as a transmitting antenna transmitting the interrogating signal toward the region of interest. The transmitted signal may be deflected to the desired direction using one or more reflecting surfaces, diffraction grating, or alignment of the amplifier 128.

Typically, as mentioned above, the radiation transmission unit 120 may operate in pulsating mode. More specifically, the radiation source 122 may operate to emit short pulses of radiation in the first frequency range. This enables efficient down conversion by the quantum entanglement unit 124, and transmission of an interrogating pulse amplified by the amplifier 128. The reference data collected by the reference detector 126 is stored at a memory unit and used to determine correlation of radiation collected by the collection unit 130 to thereby enable distinction between reflected signal and background noise. This enables the radar system of the present technique to operate within a large detection range, as the reference data is measured direction and need not be directly interacted with the collected radiation.

Figure 4:
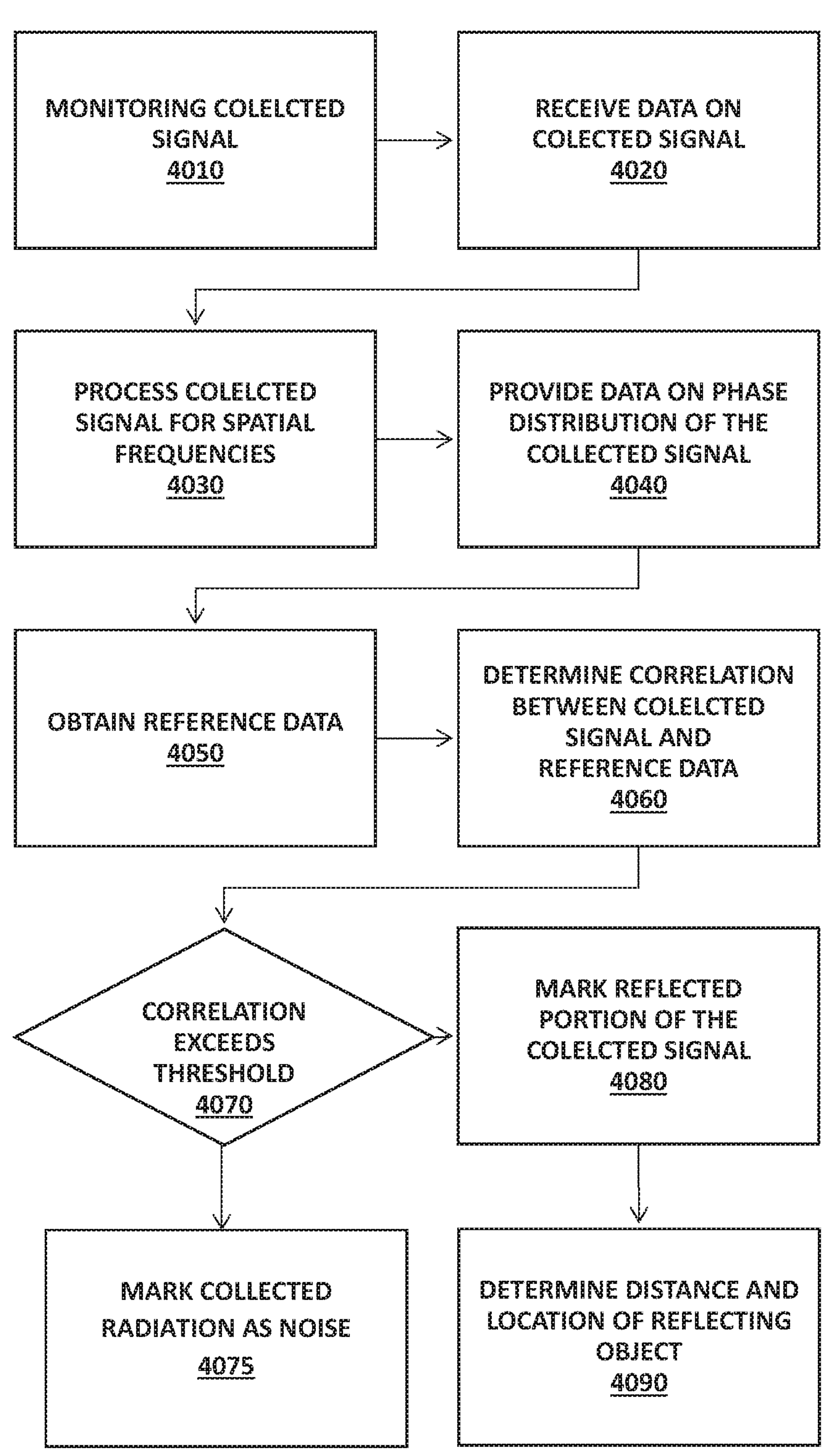
FIG. 4 is a flow chart exemplifying operation of a radar system according to some embodiments of the invention.

As indicated above, the processing unit 160 may generally include one or more processors and memory and is configured to receive and store reference data from the radiation transmission unit 120, and to receive data on collected radiation from the radiation collected unit 140 and process the data on collected radiation to determine data on existence and location of one or more objects in the region of interest. Reference is made to FIG. 4 exemplifying in a way of a flow diagram, operation so the processor(s) of the processing unit 160 in response to collection of radiation by the radiation collection unit 140. Typically, the processing unit 160 received reference data from the radiation transmission unit 120 and stores it in the memory for use for analyzing collected radiation. At this stage, the processing unit 160 is operated for monitoring 4010 data on radiation collected by the radiation collection unit 140. When radiation is collected with intensity exceeding a minimal signal threshold, the processing unit receives data on the collected radiation and operated to process the collected data 4020. The processing may include, determining spatial frequencies in the collected signal 4030, this is based on the array configuration of the detector array 142. Processing of spatial frequencies within the collected radiation is used in somewhat similar manner as determining a collection beam in a general phased array antenna arrangement. It should be noted that according to the present invention, determining a collect beam is directed at increasing correlation accuracy in determining correlation between the data on the collected radiation and the reference data. Accordingly, in some embodiments, typically when operating with low amplitude interrogating signals, the processing unit 160 may avoid constructing collect beams, and only utilize data on spatial frequencies of the collected signal after determining sufficiently high correlation with the reference data.

In some embodiments, the data to be correlated in phase distribution with respect to local oscillator as described above. To this end, the processor may determine 4040 within the collected radiation (or within the constructed collect beam) data on phase distribution of the photons within the collected signal. The processor operates to obtain the reference data from the memory 4050 and determines correlation between the collected and reference data 4060. The processor determines if the correlation exceeds a selected or predetermined threshold 4070, where if the correlation is lower than the threshold, the collected radiation is marked as noise 4075 and the process may continue for other collected radiation. If the correlation is determined to exceed the threshold, at least a portion of the collected radiation is marked as signal that is a reflection of the interrogating signal 4080 or include a portion of reflected signal. The so-marked portion of the collected radiation is further processed 4090 for determining data on location and distance of one or more objects reflecting the interrogating signal.

Figure 5:
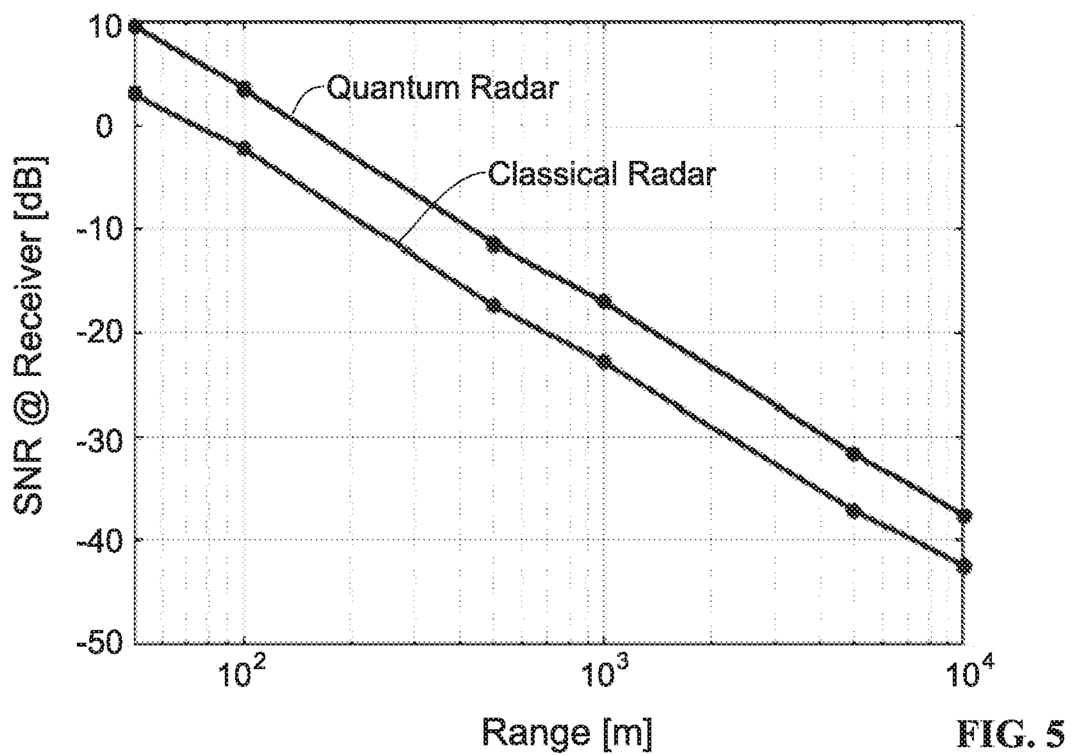
FIG. 5 shows signal to noise ratio simulated between radar system according to the present technique and a conventional radar system.
Figure 6:
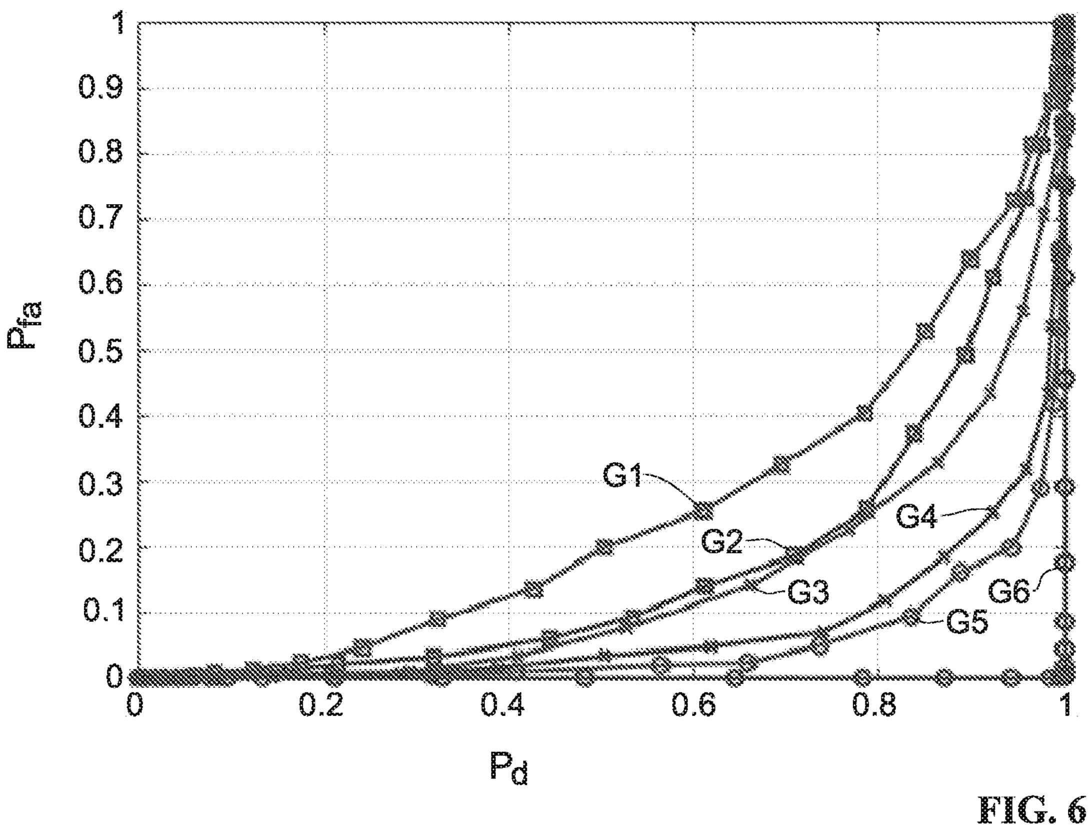
FIG. 6 shows simulated receiver operating characteristics for radar system according to the present technique and conventional radar system for selected different distances.

The Inventors have conducted simulations comparing operation of the radar system as described herein above and operation of conventional radar systems. FIG. 5 shows simulated signal to noise ratio (SNR) obtained by the radar system for different target ranges; FIG. 6 shows receiver operating characteristics (ROC) for radar system as described above and conventional radar system for target ranges of 1250 m 2500 m and 5000 m.

In these examples, the simulated radar system according to the present technique utilizes spontaneous parametric down conversation (SPDC) for generation of pairs of entangled photons. As indicated above, the pairs of entangled photons are formed of first transmitted photons (signal) and second reference photons (idler). The simulation utilizes integration time associated with transmission of $10^6$ photons toward a target and detection of reflected photons coming back from the target.

FIG. 5 shows coincident simulation (translated to dB) of the photons collected at the radiation collected unit 140 as a function of range. The simulation data utilizes 0.1 signal photons and 0.5 noise photons. As shown, the radar system of the present technique, that uses signal and idler correlation for detection of reflected radiation shown SNG gain of about 6 dB over the SNR provided by the conventional radar system.

FIG. 6 shows simulated receiver operating characteristics (ROC) curves for radar system using quantum entangled photon according to some embodiments of the present invention and conventional radar system. The figure includes ROC curves G1-G6, where curves G1, G3 and G5 relate to conventional radar system, and G2, G4 and G6 relate to radar system utilizing quantum entangled photons as described above. Curves G1 and G2 detection range of 5000 m, curves G3 and G4 relate to detection range of 2500 m and curves G5 and G6 relate to detection range of 1250 m. As shown, the radar system of the present technique shows enhancement in ROC as well as in SNR over conventional radar system for each of the detected ranges. This is at least partially due to the ability of the radar system of the present technique to identify radiation portions being relating to the transmitted photons over collected noise in accordance with quantum entanglement between the transmitted and reference (Idler) photons.

As the present technique may typically operate in open air environment, single photon detection abilities may be limited. Accordingly, the present technique utilizes correlation between phase distribution of a plurality of photons to assess if the collected photons are indeed a reflection of the interrogating signal or are associated with background noise. The correlation of phase distribution may be maintained for various propagation distances and scattering events even if the actual phase difference varies. This is since the distribution is generally between the plurality of photons within the collected radiation, or between the second reference photons. The local oscillator 180 is used to provide a typically constant phase anchor that allows the present technique to obtain reliable phase data from a plurality of photons and compare it wo phase data collected from a different plurality of photons.

The invention claimed is:

1. A radar system, comprising:

a radiation transmission unit, a radiation collection unit, a local oscillator, and a processing unit;

the radiation transmission unit is configured for generating electromagnetic radiation formed by a plurality of pairs of quantum entangled photons comprising first transmitted photons (signal) and second reference photons (idler); the radiation transmission unit is configured to transmit an interrogating signal formed of the first transmitted photons toward a region to be inspected and to measure the second reference photons to obtain and store measured data thereof;

the radiation collection unit comprises an array of single photon detectors (SPDS), each SPDS is configured to receive photons reflected from one or more objects in said region and generate data indicative of one or more parameters of the collected photons, wherein the data comprises data on spatial arrangement of collected radiation, and wherein each SPDS comprises one or more color centers within a crystal structure; and the processing unit is configured to receive stored measured data on the second reference photons from the radiation transmission unit and data of parameters of the collected photons from the radiation collection unit, and to determine correlation between the measured reference photons and the collected photons to thereby differentiate within the collected photons between noise and reflection of said first transmitted photons from one or more objects in the region to be inspected;

wherein said radiation transmission unit is operable to determine phase of the second reference photons with respect to phase of said local oscillator and provide measured data comprising phase relation distribution of said second reference photons, said radiation collection unit operates for determining phase relations between collected photons and phase of said local oscillator, thereby enabling said processing unit to determine phase relation distribution correlation between the measured reference photons and the collected photons.

2. The radar system of claim 1, wherein said radiation transmission unit further comprises a radiation amplifying unit configured to provide coherent amplification to said first transmitted photons to thereby enhance intensity of transmitted signal.

3. The radar system of claim 2, wherein said amplifying unit comprises a maser amplifier.

4. The radar system of claim 1, wherein said SPDS are operated for detection of electromagnetic radiation within a selected frequency range.

5. The radar system of claim 1, wherein said one or more color centers comprise one or more nitrogen-vacancy (NV)-centers.

6. The radar system of claim 1, wherein a drive unit of said SPDS is synchronized with said local oscillator.

7. The radar system, of claim 1, wherein said processing unit is configured and operable for determining data on collected radiation wavefront based on collected photons having correlation with said second reference photons above a predetermined threshold, said data on collected radiation wavefront is thereby determined based on collection of the entangled first photons.

8. The radar system of claim 1, wherein said electromagnetic radiation is within microwave frequency range.

9. The radar system of claim 1, wherein said radiation collection unit is configured for sweeping over frequency of collected photons, thereby enabling detection of doppler shifts in collected radiation.

10. A method for use in a radar system, the method comprising:

generating one or more pairs of entangled photons, transmitting an interrogating signal formed of first photons toward a selected region, and detecting second photons to determine one or more parameters thereof;

using a radiation collection unit comprising an array of single photon detectors (SPDS), each comprising one or more color centers within a crystal structure, and collecting radiation arriving from said selected region and generating data about collected photons;

processing said data about collected photons and determining correlation between collected photons and parameters of said second photons, generating data of collected entangled radiation formed by photons having correlation above a predetermined threshold;

processing said data of collected entangled radiation and determining data on one or more objects in said selected region;

wherein said detecting second photons to determine one or more parameters thereof comprises detecting said second photons with respect to a local oscillator and determining reference data comprising phase relation distribution of said second photons, and wherein collecting radiation arriving from said selected region comprises detecting collected photons with respect to said local oscillator and determining phase relation distribution of said collected photons, and wherein said determining correlation between collected photons and parameters of said second photons comprises determining correlation in phase relation distribution between said second photons and said collected photons.

11. The method of claim 10, further comprising transmitting the first photons through a coherent amplifier for amplifying the transmitted signal while maintaining entanglement between the first and second photons.

12. The method of claim 10, wherein said collecting radiation comprises using a detection unit formed by an array of NV-based detecting elements thereby detecting photons of the collected radiation and determining phase information of the collected photons.

13. The method of claim 10, wherein said parameters of the second photons comprise phase of the second photons with respect to a predetermined cycle, said determining correlation of collected photons and parameters of said second photons comprises determining phase data of the collected photon with respect to the predetermined cycle and determining variation in phase with respect to the predetermined cycle with that of the second photons.

* * * * *